(12) United States Patent
Liao et al.

(10) Patent No.: US 9,684,103 B2
(45) Date of Patent: Jun. 20, 2017

(54) STRUCTURED LIGHT GENERATION DEVICE AND LIGHT SOURCE MODULE WITH THE SAME

(71) Applicant: AHEAD OPTOELECTRONICS, INC., New Taipei (TW)

(72) Inventors: Hong-Zong Liao, New Taipei (TW); Ying-Yueh Chang, New Taipei (TW)

(73) Assignee: AHEAD OPTOELECTRONICS, INC., New Taipei (TW)

( * ) Notice: Subject to any disclaimer, the term of this patent is extended or adjusted under 35 U.S.C. 154(b) by 103 days.

(21) Appl. No.: 14/706,363

(22) Filed: May 7, 2015

(65) Prior Publication Data

US 2015/0323155 A1 Nov. 12, 2015

(30) Foreign Application Priority Data

May 9, 2014 (TW) .............................. 103208136 U

(51) Int. Cl.
| | | |
|---|---|---|
| *G02B 27/20* | (2006.01) | |
| *G02B 5/18* | (2006.01) | |
| *F21V 13/02* | (2006.01) | |
| *G06F 3/01* | (2006.01) | |
| *G02B 3/00* | (2006.01) | |

(52) U.S. Cl.
CPC ............ *G02B 5/1866* (2013.01); *F21V 13/02* (2013.01); *G02B 3/005* (2013.01); *G02B 5/1814* (2013.01); *G06F 3/017* (2013.01)

(58) Field of Classification Search
CPC .... G02B 5/1866; G02B 3/005; G02B 5/1814; F21V 13/02; G06F 3/017

USPC ............ 362/259, 268, 311.01, 326, 333, 362
See application file for complete search history.

(56) References Cited

U.S. PATENT DOCUMENTS

| 4,456,336 A * | 6/1984 | Chung ................. G02B 3/0043 349/113 |
| 2003/0179364 A1* | 9/2003 | Steenblik ............... B82Y 20/00 356/71 |
| 2007/0228927 A1* | 10/2007 | Kindler .................. G03B 21/56 313/495 |
| 2008/0117531 A1* | 5/2008 | Asper ...................... G01V 8/12 359/710 |

(Continued)

FOREIGN PATENT DOCUMENTS

| GB | WO 2015011494 A1 * | 1/2015 | ............. B42D 25/29 |
| GB | 2518286 A * | 3/2015 | ............. B42D 25/29 |
| JP | WO 2013001709 A1 * | 1/2013 | ......... G02B 27/4205 |

*Primary Examiner* — Anh Mai
*Assistant Examiner* — Glenn Zimmerman
(74) *Attorney, Agent, or Firm* — WPAT, PC

(57) ABSTRACT

A structured light generation device includes a first surface structure and a second surface structure, which are opposed to each other. The first surface structure includes a diffractive optical element. The second surface structure includes a lenticular lens structure. By the diffractive optical element, an incident dot beam is processed into plural dot beams with different sizes and different brightness values. By the lenticular lens structure, the each dot beam is expanded to a linear beam. After the single dot beam is processed by the structured light generation device, a structured light is generated. The structured light generation device can be applied to a projection system with a 3D gesture sensing control or detection device.

10 Claims, 5 Drawing Sheets

(56) References Cited

U.S. PATENT DOCUMENTS

2013/0141634 A1* 6/2013 Korenaga .......... G02B 27/4205
  348/360
2013/0154251 A1* 6/2013 Jolic .................... G02B 3/0006
  283/85
2016/0176221 A1* 6/2016 Holmes ................. B42D 25/29
  283/77

* cited by examiner

STRUCTURED LIGHT GENERATION DEVICE AND LIGHT SOURCE MODULE WITH THE SAME

FIELD OF THE INVENTION

The present invention relates to an optical element, and more particularly to a structured light generation device for projecting a structured light and an application system thereof.

BACKGROUND OF THE INVENTION

A 3D-space object measurement technique is widely used for detecting and analyzing the shape, appearance and distance of an under-test object. Generally, by the 3D-space object measurement technique, a light beam is projected to the under-test object, and the distance of the object in the 3D space is calculated according to the reflection of the light beam. Since the measured data contains the depth information, the measured data is also referred as a depth image.

Generally, the methods for capturing the depth image of the object are classified into contact type methods and non-contact type methods. For example, a 3D gesture sensing control method is one of the non-contact type methods. Moreover, the 3D gesture sensing control method may be implemented by three major techniques, including a structured light scanning technology, a time-of-fight (ToF) measurement technology and a triangulation technology.

The structured light is a light with a specified pattern. When the light with the specified pattern is projected on the under-test object, the light is subjected to deformation. Consequently, a camera may be used to acquire the image information of the deformed structured light that is influenced by the object surface. The image information contains the distance of the object, the shape change of the object change or the object gap.

Therefore, it is important to generate an easily-read structured light for the 3D gesture sensing control.

SUMMARY OF THE INVENTION

An object of the present invention provides a structured light generation device. After a laser beam is introduced into the structured light generation device, plural fringes with different brightness values and different widths are periodically generated and collaboratively formed as a structured light.

Another object of the present invention provides a structured light generation device comprising a diffractive optical element (DOE) and a lenticular lens structure, which are located at two opposite sides. The structured light generation device can minimize the influence of the bright zero-order diffraction (also referred as a DC term) and produce better structured light distribution.

A further object of the present invention provides a structured light generation device comprising a diffractive optical element (DOE) and one or more lenticular lens structures. The diffractive optical element and the lenticular lens structures are located at two opposite sides. Since the structured light generation device of the present invention has low selectivity on the incident light, the light behavior of the structured light distribution is more uniform. Under this circumstance, the flexibility of selecting the incident light is enhanced.

In accordance with an aspect of the present invention, there is provided a structured light generation device. The structured light generation device includes a light-transmissible substrate, a first surface structure and a second surface structure. The first surface structure is located at a first side of the light-transmissible substrate. The first surface structure includes a diffractive optical element. The second surface structure is located at a second side of the light-transmissible substrate. The first side and the second side are opposed to each other. The second surface structure includes a first lenticular lens structure.

In an embodiment, the diffractive optical element includes a diffraction pattern structure with plural straight lines and/or plural curvy line, wherein widths or lengths of the plural straight lines and/or plural curvy lines are identical or different.

In an embodiment, the first lenticular lens structure includes plural parallel first cylindrical lenses, wherein the plural first cylindrical lenses are contacted with each other or spaced apart from each other.

In an embodiment, the structured light generation device further includes a second lenticular lens structure. The second lenticular lens structure is located at the second side of the light-transmissible substrate.

In an embodiment, the second lenticular lens structure includes plural parallel second cylindrical lenses, and the plural second cylindrical lenses are not in parallel with the plural first cylindrical lenses.

In an embodiment, the structured light generation device further includes a second lenticular lens structure. The second lenticular lens structure is located beside the first lenticular lens structure. The second lenticular lens structure is a part of the second surface structure. The first lenticular lens structure includes plural parallel first cylindrical lenses. The second lenticular lens structure includes plural parallel second cylindrical lenses. The plural first cylindrical lenses are not in parallel with the plural second cylindrical lenses.

In an embodiment, the light-transmissible substrate, the first surface structure and the second surface structure are made of the same medium, or the light-transmissible substrate and the second surface structure are made of the same medium.

In an embodiment, the first surface structure and the second surface structure are produced through UV adhesives.

In accordance with another aspect of the present invention, there is provided a light source module. The light source module includes a structured light generation device, a laser source and a housing. The structured light generation device includes a light-transmissible substrate, a first surface structure and a second surface structure. The first surface structure is located at a first side of the light-transmissible substrate. The first surface structure includes a diffractive optical element. The second surface structure is located at a second side of the light-transmissible substrate. The first side and the second side are opposed to each other. The second surface structure includes a first lenticular lens structure. The housing accommodates the laser source and the structured light generation device. After a laser beam from the light source is processed by the structured light generation device, a structured light is outputted from the housing.

In accordance with a further aspect of the present invention, there is provided a light source module. The light source module includes a structured light generation device, a laser source and a housing. The structured light generation device includes a light-transmissible substrate, a first surface structure and a second surface structure. The first surface structure is located at a first side of the light-transmissible substrate. The first surface structure includes a diffractive optical element. The second surface structure is located at a second side of the light-transmissible substrate. The first side and the second side are opposed to each other. The second surface structure includes a first lenticular lens structure and a second lenticular lens structure. The diffractive optical element includes a diffraction pattern structure with plural straight lines and/or plural curvy line, and widths or lengths of the plural straight lines and/or plural curvy lines are identical or different. The first lenticular lens structure includes plural parallel first cylindrical lenses. The plural first cylindrical lenses are contacted with each other or spaced apart from each other. The housing accommodates the laser source and the structured light generation device. After a laser beam from the light source is processed by the structured light generation device, a structured light is outputted from the housing.

The above objects and advantages of the present invention will become more readily apparent to those ordinarily skilled in the art after reviewing the following detailed description and accompanying drawings, in which:

DETAILED DESCRIPTION OF THE PREFERRED EMBODIMENT

Figure 1:
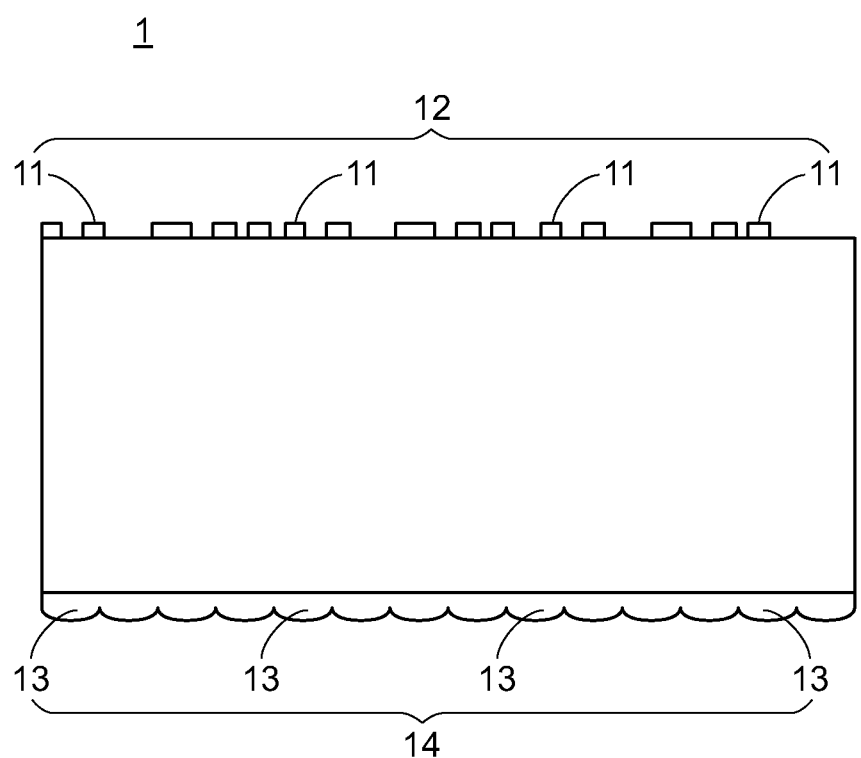
FIG. 1 is a schematic cross-sectional view illustrating a structured light generation device according to a first embodiment of the present invention.
Figure 2:
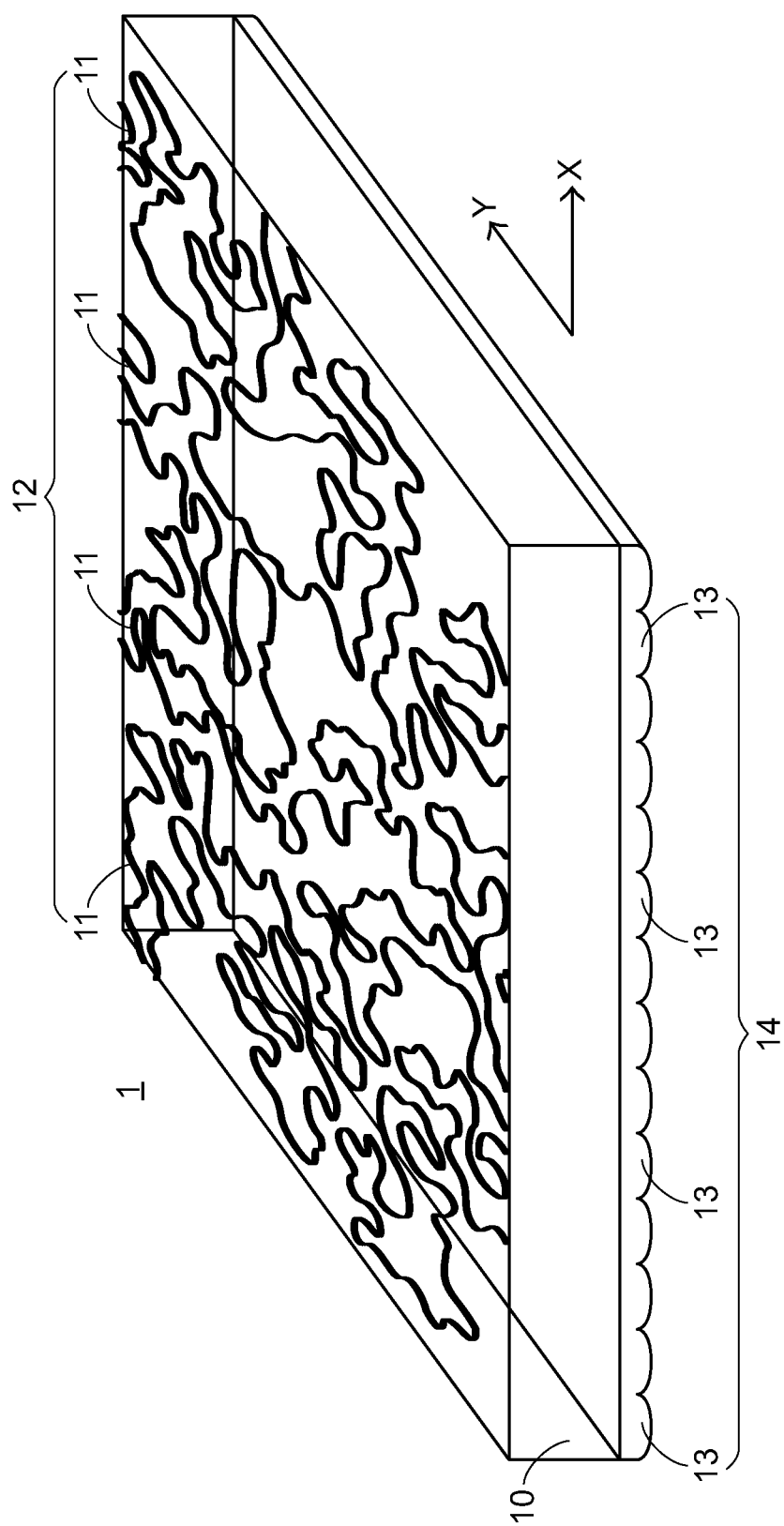
FIG. 2 is a schematic perspective view illustrating the structured light generation device according to a first embodiment of the present invention.

FIG. 1 is a schematic cross-sectional view illustrating a structured light generation device according to a first embodiment of the present invention. FIG. 2 is a schematic perspective view illustrating the structured light generation device according to a first embodiment of the present invention. Please refer to FIGS. 1 and 2. The structured light generation device 1 comprises a light-transmissible substrate 10, a first surface structure 12 and a second surface structure 14. The first surface structure 12 and the second surface structure 14 are respectively located at two opposite sides of the light-transmissible substrate 10. In this embodiment, the first surface structure 12 comprises a diffraction pattern structure 11 with plural straight lines and/or plural curvy lines. That is, the first surface structure 12 comprises a diffractive optical element (DOE). In particular, the straight lines and the curvy lines of the diffraction pattern structure 11 are distributed as the entire of the first surface structure 12. The plural straight lines and the plural curvy lines may be arranged at different densities. Moreover, the lengths and/or the widths of the plural straight lines and the plural curvy lines of the diffraction pattern structure 11 may be identical or different.

In this embodiment, the second surface structure 14 is a lenticular lens structure comprising plural parallel first cylindrical lenses 13. Moreover, the plural first cylindrical lenses 13 are contacted with each other or spaced apart from each other. In this embodiment, the cylindrical bodies of the plural first cylindrical lenses 13 extend along a Y-axis direction, and the plural first cylindrical lenses 13 are arranged along an X-axis direction. The relationships between the first cylindrical lenses 13 and the diffraction pattern structure 11 will be illustrated later.

Figure 3:
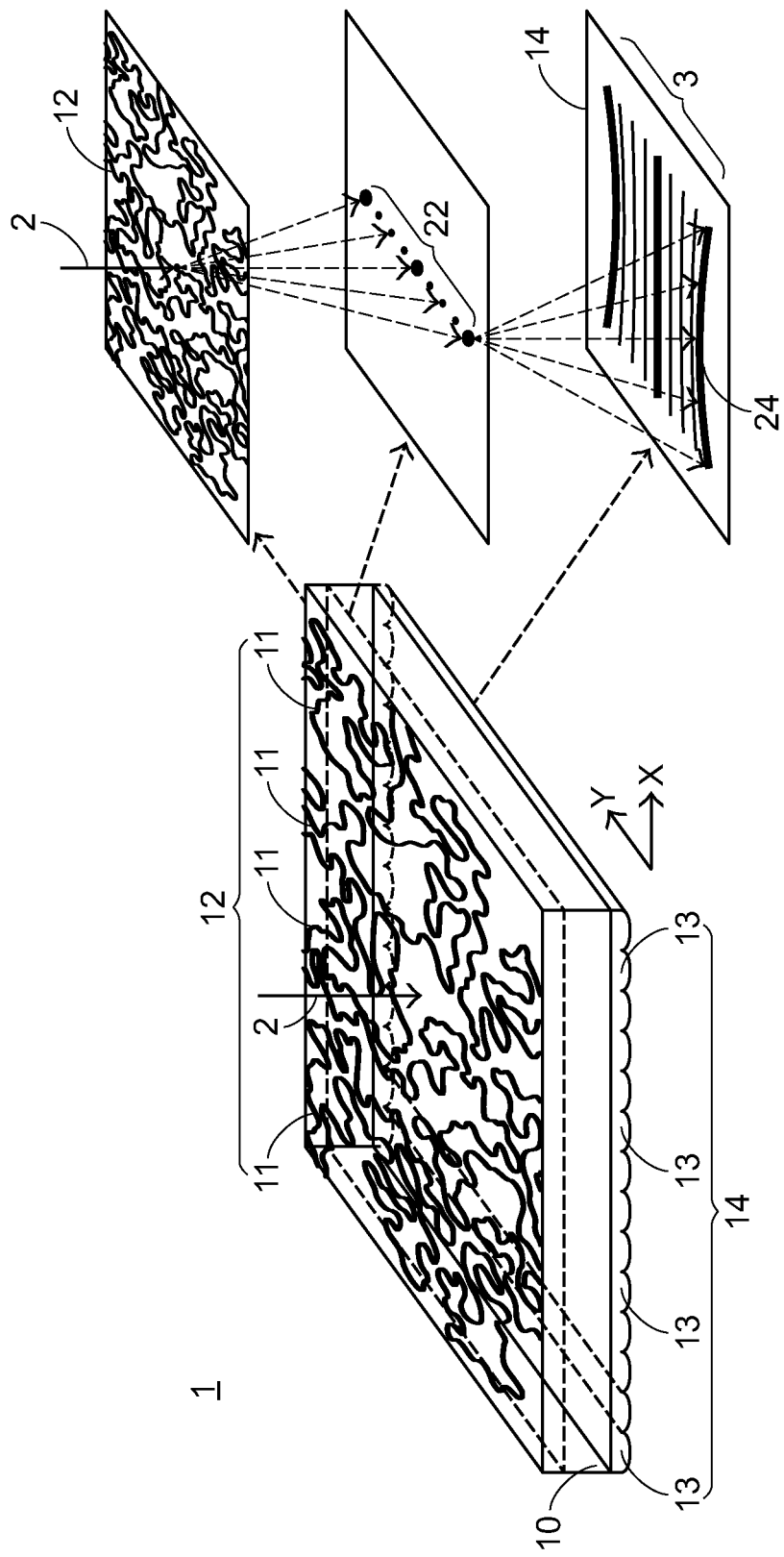
FIG. 3 schematically illustrates the optical path of the structured light generation device according to a first embodiment of the present invention.

FIG. 3 schematically illustrates the optical path of the structured light generation device according to a first embodiment of the present invention. In practice, an incident laser beam is introduced into the structured light generation device 1 through the first surface structure 12 or the second surface structure 14. As shown in FIG. 3, a single dot beam 2 (also referred to a first dot beam) is diffracted into plural second dot beams 22 (also referred to second dot beams) by the first surface structure 12 (i.e., the diffractive optical element). The plural second dot beams 22 are distributed on each cross section of the light-transmissible substrate 10. The second dot beams 22 passing through the first surface structure 12 may have different spot sizes or different brightness values. Consequently, by the first surface structure 12 of the structured light generation device 1, the single dot beam 2 is diffracted into the plural second dot beams 22, and the plural second dot beams 22 with different brightness values are distributed within the light-transmissible substrate 10. That is, after the single dot beam 2 is transmitted through the first surface structure 12, the plural dot beams 22 in a row are generated. The spot sizes, intensities, densities and/or positions of the plural dot beams 22 in the row may be designed and designated. Moreover, for subsequently producing the desired structured light distribution, the profile of the first surface structure 12 may be adjusted according to the lenticular lens structure of the second surface structure 14. For example, in this embodiment, after the single dot beam 2 is diffracted into the linear the plural second dot beams 22 (i.e., the second dot beams) by the first surface structure 12, the linear distribution of the plural second dot beams 22 is in parallel with the extending direction of the first cylindrical lens 13 of the lenticular lens structure of the second surface structure 14. That is, the plural second dot beams 22 are arranged along the Y-axis direction. Moreover, in accordance with the present invention, the angles or the profiles of the plural straight lines and/or plural curvy lines of the diffraction pattern structure of the first surface structure 12 are adjustable. Consequently, the linear distribution of the plural second dot beams 22 may be inclined relative to the extending direction of the first cylindrical lens 13 of the lenticular lens structure of the second surface structure 14 at another angle. By this angle, the linear distribution of the plural second dot beams 22 and the extending direction of the first cylindrical lens 13 are not orthogonal. Consequently, after the plural second dot beams 22 are transmitted through the second surface structure 14 subsequently, the desired structured light distribution can be produced.

After each of the plural second dot beams 22 is transmitted through the second surface structure 14 (i.e., the lenticular lens structure) of the structured light generation device 1, a linear beam 24 is produced. Consequently, after the plural second dot beams 22 are transmitted through the second surface structure 14, plural linear beams 24 are produced. Since the plural second dot beams 22 have different spot sizes or different brightness values, the plural linear beams 24 are distributed at different line widths or different brightness values. Moreover, depending on the positions, the linear beams 24 may have straight line profiles or curvy line profiles. Consequently, the plural linear beams 24 are collaboratively formed as the structured light 3 with distributed fringes. In other words, each of the dot beams 22 is expanded as a two-dimensional linear beam or linear band beam by the second surface structure 14 of the structured light generation device 1. In case that the distance between two adjacent dot beams 22 is very short, these two dot beams 22 are expanded as the linear band beam macroscopically. After the plural second dot beams 22 with different brightness values are expanded by the second surface structure 14 of the structured light generation device 1, the structured light 3 with distributed fringes of different brightness values is produced from the single dot beam 2. Similarly, in case that the single dot beam 2 is introduced into the structured light generation device 1 through the second surface structure 14 of the structured light generation device 1, the single dot beam 2 is firstly expanded and then distributed with different brightness values by the structured light generation device 1. Consequently, the structured light 3 can be used in a 3D gesture sensing control projection system or a non-destructive testing projection system. Moreover, the structured light generation device 1 for generating the structured light 3 and a laser source may be integrated as a laser diode light source module. The applications of the structured light generation device are presented herein for purpose of illustration and description only.

A process of fabricating the structured light generation device of the present invention will be illustrated as follows. Firstly, the light-transmissible substrate 10 is made of a transparent material such as polycarbonate (PC). Then, two UV adhesives are respectively formed on the two opposite surfaces (i.e., the first surface and the second surface) of the light-transmissible substrate 10. Then, the first surface structure 12 and the second surface structure 14 are produced through the two UV adhesives. In accordance with another process of fabricating the structured light generation device, a lenticular lens module of the same medium (i.e., a combination of the lenticular lens structure and the light-transmissible substrate 10) is firstly provided. After a UV adhesive is formed on the surface of the lenticular lens module which is opposed to the lenticular lens structure, the first surface structure 12 is produced through the UV adhesive. Alternatively, the molds for fabricating the diffractive optical element and the lenticular lens module are firstly provided, and then the structured light generation device with the same medium is produced through the molds by an injection molding process.

Figure 4:
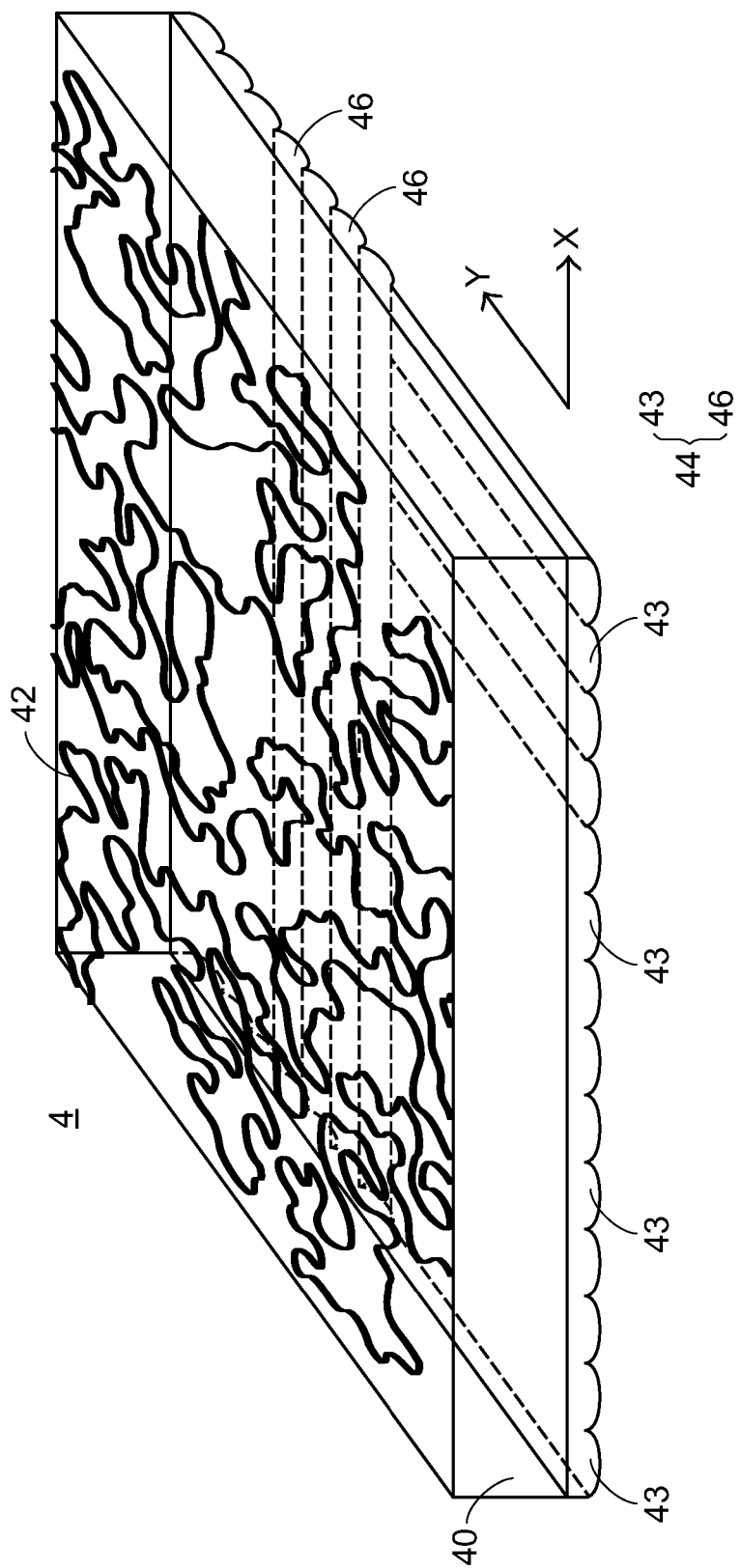
FIG. 4 is a schematic perspective view illustrating a structured light generation device according to a second embodiment of the present invention.

FIG. 4 is a schematic perspective view illustrating a structured light generation device according to a second embodiment of the present invention. As shown in FIG. 4, the structured light generation device 4 comprises a light-transmissible substrate 40, a first surface structure 42 and a second surface structure 44. The first surface structure 42 of the structured light generation device 4 is similar to the first surface structure 12 of the structured light generation device 1, and is not redundantly described herein. In comparison with the first embodiment, the structured light generation device 4 of this embodiment comprises a first lenticular lens structure and a second lenticular lens structure. The first lenticular lens structure and the second lenticular lens structure are located at the second side of the light-transmissible substrate 40. Moreover, the first lenticular lens structure, the second lenticular lens structure and the second surface structure 44 have the same surface. Like the first embodiment, the first lenticular lens structure comprises plural parallel first cylindrical lenses 43. Moreover, the second lenticular lens structure is located beside the first lenticular lens structure, and the second lenticular lens structure is a part of the second surface structure 44. In this embodiment, the second lenticular lens structure comprises plural parallel second cylindrical lenses 46, which are not in parallel with the plural parallel first cylindrical lenses 43. That is, the included angle between each second cylindrical lens 46 and each first cylindrical lens 43 is not equal to 0 or 180 degrees.

Moreover, due to the arrangement of the second lenticular lens structure, the profile of the first surface structure 42 needs to be adjusted in order to modulate the distribution of the diffracted light beams by the first surface structure 42. Consequently, regardless of whether the single dot beam is introduced into the structured light generation device 4 through the first surface structure 42 or the second surface structure 44, after the single dot beam is transmitted through the structured light generation device 4, the desired structured light can be produced. Moreover, the curvature of each second cylindrical lens 46 and the curvature of each first cylindrical lens 43 may be identical or different. Consequently, the function and utility of the structured light generation device 4 are similar to those of the structured light generation device 1, or the structured light generation device 4 can achieve different structured light distribution.

Figure 5:
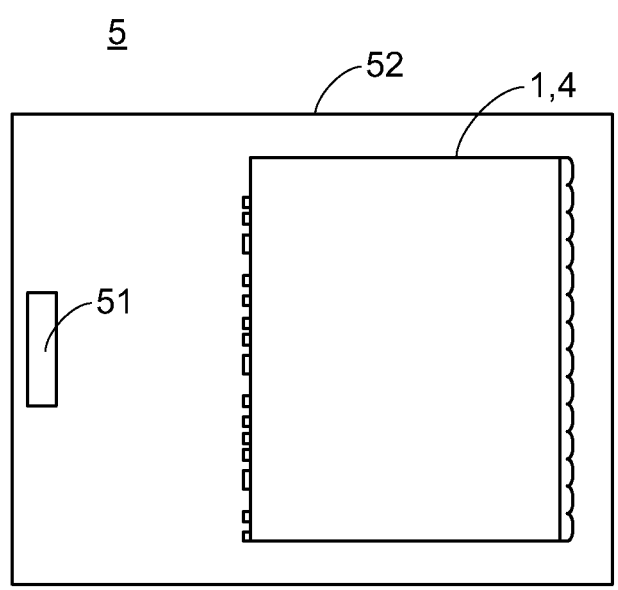
FIG. 5 is a schematic side view illustrating a light source module comprising the structured light generation device of the present invention.

FIG. 5 is a schematic side view illustrating a light source module comprising the structured light generation device of the present invention. The light source module 5 is a laser diode module. The light source module 5 comprises a light source 51 and the structured light generation device 1 or 4. The light source module 5 is disposed within a housing 52. After the light beam emitted by the light source 51 is processed by the structured light generation device 1 or 4, the structured light is outputted from the housing 52. In this embodiment, the light source 51 is a laser source. Moreover, the light beam emitted by the light source 51 is a visible light beam or an invisible light beam. Since the light source 51 and the structured light generation device 1 or 4 are included in the housing 52, the thickness of the housing 52 can be reduced. That is, the light source module 5 is suitably applied to a slim-type handheld device or other electronic device for directly outputting the structured light. If the light source module 5 cooperates with the detecting or sensing element of the handheld device or other electronic device, a projection system for executing a special function (e.g., the 3D gesture sensing control function) can be provided.

From the above descriptions, the structured light generation device of the present invention has following advantages. Firstly, in comparison with the conventional optical component with two DOE structures, the structured light generation device of the present invention can minimize the influence of the bright zero-order diffraction (also referred as a DC term) and produce better structured light distribution for subsequent structured light scanning, calculation and implementation. Secondly, since the structured light generation device of the present invention has low selectivity on the incident light, the incident light for the structured light generation device of the present invention has a broad wavelength range. Under this circumstance, the applications of the structured light generation device are increased. Thirdly, the structured light generation device of the present invention and a light source can be directly integrated as a slim-type light source module. Consequently, the structured light generation device of the present invention can be applied to the slim-type electronic device or the slim-type handheld device.

What is claimed is:

1. A structured light generation device, comprising:
   a light-transmissible substrate;
   a first surface structure located at a first side of the light-transmissible substrate, wherein the first surface structure comprises a diffractive optical element; and
   a second surface structure located at a second side of the light-transmissible substrate, wherein the first side and the second side are opposed to each other, and the second surface structure comprises a first lenticular lens structure,
   wherein a single first dot beam is diffracted by the diffractive optical element into a row of plural second dot beams, and each second dot beam is expanded into a corresponding line beam by the first lenticular lens structure.

2. The structured light generation device according to claim 1, wherein the diffractive optical element comprises a diffraction pattern structure with plural straight lines and/or plural curvy lines, wherein widths or lengths of the plural straight lines and/or plural curvy lines are identical or different.

3. The structured light generation device according to claim 1, wherein the first lenticular lens structure comprises plural parallel first cylindrical lenses, wherein the plural first cylindrical lenses are contacted with each other or spaced apart from each other.

4. The structured light generation device according to claim 1, further comprising a second lenticular lens structure, wherein the second lenticular lens structure is located beside the first lenticular lens structure, and the second lenticular lens structure is a part of the second surface structure, wherein the first lenticular lens structure comprises plural parallel first cylindrical lenses, the second lenticular lens structure comprises plural parallel second cylindrical lenses, and the plural first cylindrical lenses are not in parallel with the plural second cylindrical lenses.

5. The structured light generation device according to claim 1, wherein the light-transmissible substrate, the first surface structure and the second surface structure are made of the same medium, or the light-transmissible substrate and the second surface structure are made of the same medium.

6. The structured light generation device according to claim 1, wherein the first surface structure and the second surface structure are produced through UV adhesives.

7. The structured light generation device according to claim 3, further comprising a second lenticular lens structure, wherein the second lenticular lens structure is located at the second side of the light-transmissible substrate.

8. The structured light generation device according to claim 7, wherein the second lenticular lens structure comprises plural parallel second cylindrical lenses, and the plural second cylindrical lenses are not in parallel with the plural first cylindrical lenses.

9. A light source module, comprising:
a structured light generation device comprising:
  a light-transmissible substrate;
  a first surface structure located at a first side of the light-transmissible substrate, wherein the first surface structure comprises a diffractive optical element; and
  a second surface structure located at a second side of the light-transmissible substrate, wherein the first side and the second side are opposed to each other, and the second surface structure comprises a first lenticular lens structure;
a laser source, emitting a single first dot laser beam; and
a housing accommodating the laser source and the structured light generation device, wherein the single first dot laser beam is diffracted by the diffractive optical element into a row of plural second dot laser beams, and each second dot laser beam is expanded into a corresponding line laser beam by the first lenticular lens to collectively output a structured light from the housing.

10. A light source module, comprising:
a structured light generation device comprising:
  a light-transmissible substrate;
  a first surface structure located at a first side of the light-transmissible substrate, wherein the first surface structure comprises a diffractive optical element; and
  a second surface structure located at a second side of the light-transmissible substrate, wherein the first side and the second side are opposed to each other, and the second surface structure comprises a first lenticular lens structure and a second lenticular lens structure, wherein the diffractive optical element comprises a diffraction pattern structure with plural straight lines and/or plural curvy lines, and widths or lengths of the plural straight lines and/or plural curvy lines are identical or different, wherein the first lenticular lens structure comprises plural parallel first cylindrical lenses, and the plural first cylindrical lenses are contacted with each other or spaced apart from each other;
a laser source, emitting a single first dot laser beam; and
a housing accommodating the laser source and the structured light generation device, wherein the single first dot laser beam is diffracted by the diffractive optical element into a row of plural second dot laser beams, and each second dot laser beam is expanded into a corresponding line laser beam by the first lenticular lens to collectively output a structured light from the housing.

* * * * *